(12) United States Patent
Van Genechten et al.

(10) Patent No.: US 8,558,815 B2
(45) Date of Patent: Oct. 15, 2013

(54) DUAL TOUCHSCREEN

(75) Inventors: Hans Van Genechten, Steenokkerzeel (BE); Filip Dhooge, Ertvelde (BE)

(73) Assignee: Barco N.V., Kortrijk (BE)

( * ) Notice: Subject to any disclaimer, the term of this patent is extended or adjusted under 35 U.S.C. 154(b) by 1442 days.

(21) Appl. No.: 11/826,079

(22) Filed: Jul. 12, 2007

(65) Prior Publication Data

US 2009/0002329 A1    Jan. 1, 2009

(30) Foreign Application Priority Data

Jun. 29, 2007   (EP) .................................... 07447041

(51) Int. Cl.
*G06F 3/042*   (2006.01)
(52) U.S. Cl.
USPC .............................. 345/175; 345/1.1; 345/173
(58) Field of Classification Search
None
See application file for complete search history.

(56) References Cited

U.S. PATENT DOCUMENTS

| | | | |
|---|---|---|---|
| 4,855,590 A | 8/1989 | Bures et al. | |
| 5,698,845 A | 12/1997 | Kodama et al. | |
| 2004/0145575 A1* | 7/2004 | Weindorf et al. | 345/173 |

FOREIGN PATENT DOCUMENTS

| | | |
|---|---|---|
| EP | 1 784 058 A2 | 5/2007 |
| JP | 61007915 | 1/1986 |

OTHER PUBLICATIONS

Mil. Spec—MIL-L-85762A, "Lighting, Aircraft, Interior, Night Vision Imaging System (NVIS) Compatible," Aug. 26, 1988 (57 pgs.).

* cited by examiner

*Primary Examiner* — Joseph Haley
(74) *Attorney, Agent, or Firm* — Bacon & Thomas, PLLC

(57) ABSTRACT

A touchscreen system for locating an opaque object in a target region, detects interruption of light beams, using two or more independent touchscreens (TS1, TS2), arranged to provide redundancy, each of the touchscreens having one or more optical emitters (10) to create the beams, and one or more optical detectors (30) to provide detection signals, and circuitry (90) to determine location coordinates of the opaque object from the detection signals. Detection circuitry or software integrates (470) an output of a switching inverter (440, 450), which switches between outputting an inverted or not inverted version of each detection signal, in phase with the modulation of the corresponding emitters. It can use wavelengths compatible with night vision equipment.

11 Claims, 3 Drawing Sheets

DUAL TOUCHSCREEN

FIELD OF THE INVENTION

This invention relates to touchscreen systems, to touchscreens, to display systems having such touchscreens, and to circuitry or software for such apparatus.

DESCRIPTION OF THE RELATED ART

It is known to provide Infra Red (IR) touchscreens (commercially available or ruggedized) based on a set of IR transmitters (LEDs) being placed opposite to IR receivers (Usually IR phototransistors) where a touch is detected by pulsing a series of LEDs one by one and at the same time polling each time an oppositely aligned receiver. When the IR energy at the opposite receiver is not sufficiently high when polled at the moment the LED is pulsed, then the assumption is made that the beam formed by an LED and receiver pair is interrupted by a stylus or finger, which implies a touch somewhere along that beam. If an array of intersecting beams is provided, then coordinates of the location of the touch can be determined.

U.S. Pat. No. 4,855,590 shows a touch input system aimed at improving ambient light compensation while permitting the use of low cost, readily available components, without undesirable increases in the intensity of the light emitted by the LEDs. Individual light emitting devices and individual light detecting devices are aligned so that emitter-detector pairs are formed. Corresponding emitters and detectors are sequentially activated so that there is no interference between beams in close proximity. During the interval in which each emitter and corresponding receiver are activated, the emitter is pulsed or modulated at a frequency markedly different from the frequency at which ambient light and noise would vary. Signals due to ambient conditions can thus be disregarded by using appropriate detector circuitry and the varying signal from the pulsed or modulated emitter can be recognized. Failure to detect this modulated signal would then correlate to the presence of an opaque element blocking the particular emitter-detector pair. Each emitter is varied a plurality of times during its activation interval to distinguish the modulated or pulsed signal from spurious signals such as those caused by switching the detectors.

U.S. Pat. No. 5,698,845 shows a conventional photo-detecting apparatus utilizing a touch panel, comprising a plurality of light emitting elements such as LEDs and a plurality of light receiving elements such as phototransistors or photodiodes. These elements are arranged in opposed relationship to each other, and are selected respectively by selector circuits. To try to reduce the effects of aging, external disturbances, dispersion of optical components and vertical and lateral distance differences, and properly determining whether the light is interrupted or enabled to transmit, this document proposes optical detection apparatus having an oscillator, a modulation circuit for modulating so that a specifically modulated light is emitted from the light emitting element based on the output of the oscillator; a light receiving element for receiving the modulated light; and a demodulation circuit for detecting the received light, wherein the presence of a light interruption is determined on the basis of the output of the demodulation circuit. The demodulation involves comparing the output signal of the light receiving element and the output signal of the oscillator for determining the presence of a light interruption between the light emitting element and the light receiving element.

SUMMARY OF THE INVENTION

An object of the invention is to provide improved apparatus or methods. According to a first aspect, the invention provides:

A touchscreen system for locating an opaque object in a target region by detecting interruption of light beams, the system having two or more independent touchscreens. In embodiments of the present invention, the touchscreens may be each for locating in the same target region, i.e. touchscreens on top of each other, meaning that they have both X- and Y-axis direction scanning in common and that they are arranged to provide redundancy. In alternative embodiments, the two or more touchscreens may have only one common scanning direction: if they are next to each other instead of on top, the X-axis of both touchscreens will scan a different area whereas the Y-axis will scan the same area. Each of the touchscreens have one or more optical emitters to create the beams, and one or more optical detectors to provide detection signals and determine location coordinates of the opaque object from the detection signals independently of the other touchscreen.

The two or more touchscreens can provide redundancy to ensure increased availability, which is useful for example for critical systems such as avionic or medical systems amongst others. And this increased availability is now obtained without having to resort to a backup detection system using different or inferior principles of operation. Notably there is no need to provide any contact sensitive layer in the target region, such as in front of a display, which could interfere with the optical qualities of the display.

Embodiments of the apparatus, or corresponding methods of using or manufacturing the apparatus, can have any additional features, some of which are set out in the claims, and described in more detail below.

One such additional feature is each touchscreen having drive circuitry to modulate the emitters, and detection circuitry to detect the same modulation in the detection signals, and discriminate from any modulated emission from the other touchscreen.

Another such additional feature is the detection circuitry of a given one of the touchscreens being synchronized to the drive circuitry of the same touchscreen. This can help improve mutual immunity between touchscreens and immunity from other noise.

Another such additional feature is the detection circuitry having an integrator coupled to an output of a switching inverter, the switching inverter being arranged to switch between outputting an inverted or not inverted version of a given detection signal, the switching being arranged to be in phase with the modulation of the corresponding emitters. This can provide a good level of discrimination for a given level of circuit complexity.

Another such feature is the detection circuitry having a comparator for comparing an output of the integrator with one or more thresholds, to determine an interruption of the corresponding beam and therefore indicate a touch.

Another such feature is circuitry for controlling an emission power of the emitters according to an output of the detection circuitry. This can enable better performance by adaptation to present conditions such as environmental conditions.

Another such feature is the touchscreens being arranged to create beams covering a planar target area. This is useful for many applications.

Another such feature is each touchscreen having their emitters and detectors mounted on a frame around the planar target region, the frames being adjacent to each other so that their target areas are parallel and adjacent. Such a construction provides more mutual independence and keeps complexity of manufacture low and thus keeps costs low.

Another such feature is the touchscreens being arranged to use emission wavelengths which are compatible with night vision apparatus.

Another such feature is the touchscreens having an NVIS radiance smaller than $1.7 \cdot 10^{-11}$ when measured in accordance with paragraph 4.8.14 of MIL-L-85762A.

Another such feature is a display system having any of the above touchscreen systems in front of a display screen.

Another aspect provides detection circuitry or software for use with a touchscreen having one or more optical emitters to create the beams, one or more optical detectors to provide detection signals, and drive circuitry to modulate the emitters, the detection circuitry or software being arranged to receive the detection signals, and discriminate the same modulation in the detection signals, by integrating an output of a switching inverter, the switching inverter being arranged to switch between outputting an inverted or not inverted version of each detection signal, the switching being in phase with the modulation of the corresponding emitters.

Another aspect of the invention provides a touchscreen for locating an opaque object in a target region, by detecting interruption of light beams, the touchscreen having one or more optical emitters to create the beams, and one or more optical detectors to provide detection signals, drive circuitry to modulate the emitters, and detection circuitry to detect the same modulation in the detection signals, the detection circuitry having an integrator coupled to integrate the output of a switching inverter, the inverter being arranged to switch between outputting an inverted or not inverted version of each detection signal, such that the switching is in phase with the modulation of the corresponding emitters.

Particular and preferred aspects of the invention are set out in the accompanying independent and dependent claims. Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DESCRIPTION OF THE PREFERRED EMBODIMENTS

Figure 1:
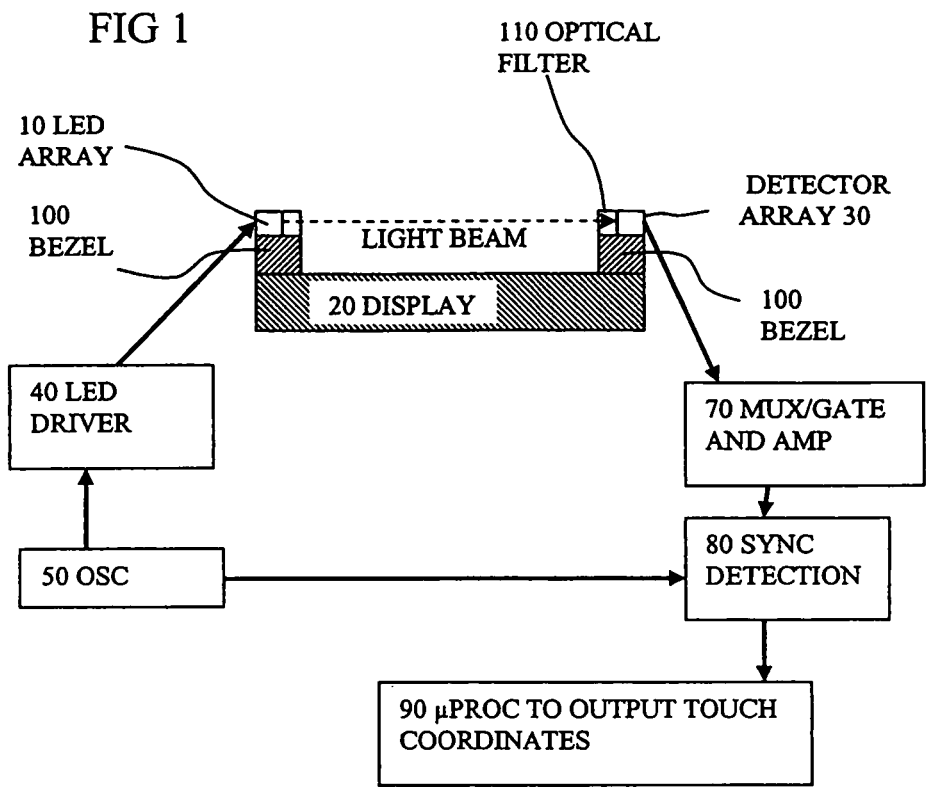
FIG. 1 shows an overall view of a touchscreen.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

References to numeric values or ranges are intended to be approximate.

References to optical are intended to encompass visible or non visible parts of the electromagnetic spectrum not limited to IR, or UV or X ray for example.

References to touchscreens are intended to encompass any optical detection system based on locating an opaque object by detecting interruption of light beams even if there is no screen, no display, nor anything to touch. The opaque object can be a finger, a stylus, or any object of any size. It can be for the purpose of pointing to enable a user to select an option, or for game playing, or for sensing presence or size for example. The target region can be of any size and can be a two dimensional area or a three dimensional space. It can be located in front of a display to enable selection of items shown on the display, or can be located elsewhere in principle, such as in free space.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Features of Touchscreens:

Touchscreens that use light beam interruption, typically use infrared beams and usually provide better performance in outdoor applications compared to capacitive or resistive types for example. Infrared touchscreens can exhibit high touch point density, can be operated with heavy gloves, are relatively cost efficient, exhibit good immunity to most false trigger sources, and are extremely rugged and weather sealable. Light sources, such as infrared photodiodes, are arranged in a row along two adjacent sides of a target region such as transparent screen arranged in front of a display such as an LCD or other type of display. Light detectors, such as photo detectors, are arranged opposite the light emitters along the two opposite adjacent sides of the touchscreen. In principle the multiple optical paths can be created by one emitter and multiple detectors, or multiple emitters and one detector, or multiple beams can be created by optical splitters or the like. When the infrared touchscreen is not being touched, the light beam from each of the light emitters crosses the screen and is received by the respective light detector. When a user touches the screen, one or more light beams are interrupted along each adjacent side so that the respective light detectors no longer receive the transmitted beams. Signals from the light detectors are sent to a controller which recognizes this signal interruption and determines the coordinates on the screen where the touch occurred, based on which optical paths were interrupted. The coordinates may be referenced to the display coordinates.

High ambient light conditions, such as direct sunlight, tend to saturate the light detectors and cause erratic operation of the touchscreen. It is known to use optical filters to address this. A broad band infrared filter can be used over the detectors to filter out ambient light and pass infrared radiation. Ambient light compensation schemes can detect the ambient light level and drive the light emitting devices to maintain the intensity of the emitted light at a level greater than the intensity of the ambient light. Physical shades can be used to shield the touchscreen from extraneous ambient light.

Dual Touchscreens

Figure 5:
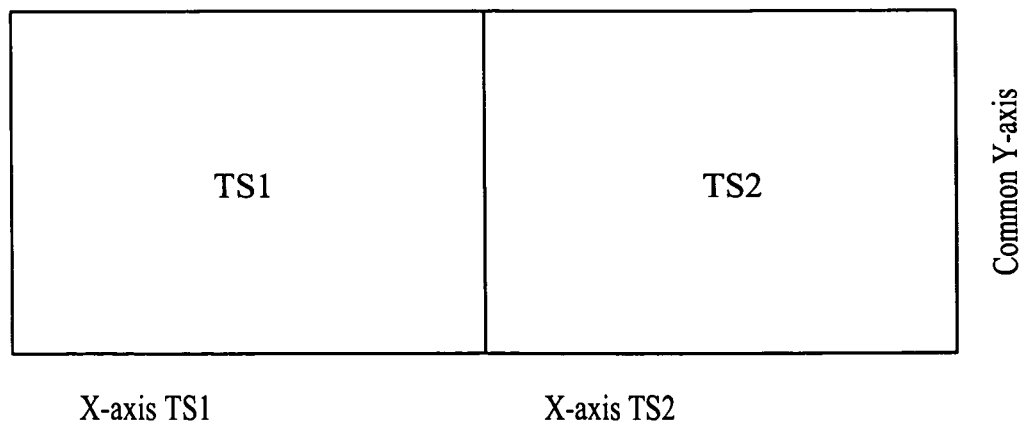
FIG. 5 shows an overall view of a dual touchscreen system according to embodiments of the present invention.

If two of these regular touchscreens (TS1 and TS2) are superimposed on the same display to form a dual touchscreen, without any means of synchronization (or coordination, so that they are not dependant on each other) then TS1 could be receiving energy from the LEDs of TS2. As the used transmitters, e.g. LEDs, typically have a rather large emitting beam (compared to the pitch of the receivers used on the sensor side), several LEDs of TS2 slightly displaced from the LED exactly opposite a given receiver of TS1, might illuminate that receiver. Hence, even if TS1 and TS2 are synchronized so that corresponding LEDs of TS2 and TS1 are not illuminated at the same time, there is still a possibility that a touch could be missed unless further measures are taken to make the screens independent. Different wavelengths of emissions and optical filtering could be used, but this on its own is unlikely to provide sufficient mutual independence and reliability at least for critical applications. Alternatively, if two of such regular touchscreens (TS1 and TS2) are put adjacent each other on the same display to form a dual touchscreen, both touchscreens have one common scanning direction. For example, if they are next to each other, as illustrated in FIG. 5, the X-axis of both touchscreens will scan a different area whereas the Y-axis will scan the "same" area. In general this means that a large screen area can be divided into a number of smaller areas which are each being scanned by a separate touchscreen, each touchscreen having one scanning direction in common with at least one other touchscreen placed adjacent to it.

This explains why regular touchscreens cannot be combined easily to create a dual touchscreen. The embodiments of the invention described here involve a way of detection which enables the device to distinguish the emissions of its own emitters more clearly.

The LED emissions are based on a modulation according to a carrier frequency while the detectors use a synchronized detection (using the carrier frequency from the same source clock as for the LED: also called tone detection) on the receiver side. This helps to distinguish between the energy emitted by the opposite LED (synchronous frequency) and any other IR source emitting at the same time. The slightest difference in frequency and even almost same frequency but de-synchronized, (in other words with a phase difference, will cause the receiver to ignore this source and filter it out, while maintaining the capability of detecting the own synchronous frequency source (the opposite LED). By using two slightly different carrier frequencies for TS1 and TS2, a dual TS for simultaneous use without mutual interference is now feasible and functional. This tone detection mechanism not only improves immunity to mutual interference but also has the effect of making the touchscreen more immune to IR ambient light disturbance, even in very dynamic ambient light environments (such as those occurring in an airplane cockpit flying at the edge of the cloud deck). Thus higher ambient IR immunity than that of a normal type IR touchscreen can be achieved. This makes it useful for single touchscreens as well as dual redundant touchscreens. Thus the touchscreen can be useful for outdoor applications such as avionics usage, and for other high performance or life-critical applications. Three examples of dual IR touchscreen systems are as follows, though others can be envisaged:

1) based on standard widely available IR LEDs of approximately 850 nm wavelength at peak of their output spectrum, for life critical applications, not needing any night vision (NVIS) capability,
2) based on IR LEDs of 940 nm, including additional IR filtering on the Transmitter side, which will result in a NVIS compatible version
3) based on IR LEDs of 1300 nm, which then will be compliant with the most stringent NVIS A requirements.

The Optical sensors array can be based on well known building blocks mostly similar to conventional IR touchscreens, except for the 940 nm and 1300 nm versions where special precautions need to be taken to ensure the NVIS compatibility or compliance.

For the 940 nm solution, this entails a narrow band-pass optical filter at the emitter side to filter out most of the IR energy situated below 900 nm. The same narrow-band filter is repeated at the receiver side, to avoid the IR receivers being saturated by energy outside the used IR band. For the 1300 nm solution, the emitter side filtering can be dispensed with, and some optical bandpass filtering can be applied at the receiver side to help avoid saturation of the IR receivers.

To ensure the fastest circuitry possible and to control better the sensibility at the receiver side, the IR receiver can be implemented using photodiodes instead of the usual phototransistors currently used in a regular IR touchscreen. The characteristics of such diodes then implies in most practical cases special electronic amplifying and filtering to achieve a readable and usable output while avoiding premature saturation in the first stage of the receiver electronics. An example of suitable receiver electronics will be described in more detail below.

Also on the receiver side in some cases there will be filtering, essentially to avoid saturation, using known techniques, and primarily as a means to establish High Ambient immunity. In our setup, it is useful to achieve the High Ambient immunity (without it the sensors risk saturation in High Ambient environment), but is not the primary factor to achieve the highest level possible in High Ambient immunity. The tone detector mechanism which will be described in more detail below can be arranged to multiply the immunity by a factor 2 to 3 in some cases.

Night Vision Compatible Touchscreens

Some embodiments of the present invention are intended for use with night vision apparatus such as cameras, sights or goggles arranged to amplify or image infra red wavelengths. In this case, the normally invisible LED emissions can become visible and interfere with the use of the display or the night vision apparatus. An NVIS compliant IR touchscreen cannot use the normal basic IR touchscreen technologies based on 850 nm LED (or close to 850 nm) as this is in the middle of the amplification spectrum of the NVIS goggles. This means an aura of light becomes visible all around the screen and depending on the scan rate, the actual beam scanning can become visible too. Existing commercial or ruggedized IR touchscreens are all based upon 850 nm IR based components (LED and usual phototransistors, but photodiodes can also be used), and therefore the normal IR touchscreen technology is rendered unusable for night vision. However at higher wavelengths, the detectors are typically less sensitive and so more susceptible to noise, thus producing more detection errors such as those caused by ambient light or other devices. If the emission power is increased to compensate, the NVIS radiance target is harder to achieve.

Some examples of embodiments of the present invention are aimed at applications such as use as part of an avionics display such that the touchscreen can be used while wearing NVIS goggles. Such touchscreen should not in any way deteriorate the optical qualities of the display as it is without touchscreen, hence any touchscreen technology that is based on resistive, capacitive, capacitive projected or any other touchscreen technology that requires a layer to be superposed on the existing optical stack cannot be used.

The Bezel of such touchscreen should not need to be larger or certainly not by much then a normal size bezel of an avionics display. Typical maximum dimension should around 6 mm thick and about 1 cm wide.

Accordingly no one has produced a practical full NVIS compatible IR touchscreen, defined by the combination of reliable detection of beams in noisy optical environments, low levels of emission at wavelengths amplified by night vision apparatus. Such a touchscreen can be defined as having, when fully operational (either in idle, no touch mode, as well as when in touch detected mode), an NVIS radiance smaller than $1.7\ 10^{-11}$ when measured in accordance with paragraph 4.8.14 of MIL-L-85762A (obtainable from http://dodssp.daps.dla.mil), whatever the techniques used to achieve this low NVIS radiance number. Some existing IR touchscreens might be used in cooperation with generation 3 NVIS goggles as being acceptable for use, but never has been demonstrated that the $1.7\ 10^{-11}$ NR can be achieved for such IR touchscreens. Embodiments of the invention can encompass any type of NVIS compatible IR touchscreens that meets this requirement, regardless of how this is accomplished. Two examples are as follows though others can be envisaged.

1) based on IR LEDs of 1020 nm, including additional IR filtering on the Transmitter side, which will result in an NVIS compatible version.
2) based on IR LED of 1300 nm, which then will be compliant with the most stringent NVIS requirements without additional filtering.

Night vision compatible Example 1) based on 1020 nm LED and normal silicium based photoreceivers.

As the 1020 nm LED still exhibits some radiation that is visible to the NVIS goggles, by merely replacing the LED on a standard IR TS, the goal of $10^{-11}$ will not be reached. The final steps to reach the requirement are based on the insertion of an interference filter with a very steep cut-off from 0% transparency below 1000 nm and more than 90% transparency above 1005 nm for incident angles larger than 85° (measured from the surface of the filter); additional mechanical construction and components location to guarantee that any light rays that could be incident on the filter are either at angles larger then 85° or are already low enough energy so that the requirement can be met. Furthermore, the use of IR absorbing paint on the mechanics and PCB coatings can improve this further; as can the use of synchronized detection on the receivers. Such detection helps enable use of only a very low amount of energy by the emitters to maintain a stable optical link useful for the IR TS application, while guaranteeing the requirement. An example of how to implement such synchronized detection is described in more detail below.

Night vision compatible Example 2) based on the use of 1300 nm IR components.

The spectrum of the 1300 nm LEDs is such that they do not interfere at all with the NVIS goggles. However, the sensibility of the usual 1300 nm IR components is much weaker then the usual silicium based components, but is of course in direct relationship to the size of the components (real chip size as well as the size/diameter of the lenses mounted on top of them). As such it would be relatively easy to achieve an NVIS compatible IR touchscreen with rather large InGaAs based components as they are available on the market. However, the mechanical constraints prohibit the use of such large components. Further, the larger the components are, the larger the pitch, (meaning the farther they are placed from each other in terms of a center line of one pair to a center line of the next pair) and this has a direct impact on the inherent intrinsic precision of the coordinates determined and output by the IR touchscreen. To provide a sufficiently small pitch, smaller devices were used, but then the emitted output power may become lower, making the optical link then again very weak. The use of synchronized detection can compensate for this and enable a stable optical link, with the custom made small 1300 nm components. For a device with dimensions 3×2.2×1.5 (mm), as an example only, a radiant flux of 3 mW may be obtained at 20 mA. Due to the fact that there is no interference of the 1300 nm center wavelength LED with the goggles, this as such achieves a NVIS compatible touchscreen that can meet the constraints and the requirements set out above.

FIG. 1 Overall View of Touchscreen

FIG. 1 shows an example of a touchscreen according to an embodiment and arranged in front of a display 20 shown in cross-section, so the display is viewed from above in the figure. The touchscreen has an LED array 10 facing a detector array 30 at opposing sides of the display. Light beams pass across the display to be detected by the detector array, after passing through an optical filter 110 arranged in front of the detector array. Not shown for the sake of clarity are the light beams arranged perpendicular to the beam shown and thus normal to the page in this view. In some cases the optical filter can be dispensed with. A frame in the form of a bezel 100 is provided for spacing and mounting the arrays on the edges of the display. The LED array can be mounted on printed circuit boards and provided with an insulating layer if necessary to avoid short circuits if the bezel is formed of metal.

To complete the touchscreen assembly a protective face plate can be mounted over the array and display screen. The face plate can be coupled to the bezel in a manner which seals and protects the array and the display screen from damage, such as damage caused by impacts or weather.

Shown schematically are some of the circuits for producing the touch coordinates. These can be located on the same structure or circuit board as the arrays, or can be located elsewhere. A local oscillator 50 produces a carrier or tone for use in modulating the LEDs. The carrier is fed to a LED driver circuit 40 which is coupled to the LED array. The detector array is coupled to a circuit 70 arranged to multiplex or gate the signals from the detector array and amplify them before they pass to a synchronized detector 80. This is fed by the local oscillator 50 with the same carrier signal as used for driving the LEDs. The synchronized detector can be implemented in a number of ways to produce an output which is sensitive to the phase of the carrier as well as its frequency. In principle narrow band filters could be used, or a phase lock loop, but these would be relatively complex to implement with sufficient precision for many applications in terms of how well it can reject unwanted tones which are close in phase or frequency. An example of an integrator based synchronized detector will be described below in more detail. Based on the output of the detector for all the beams, a microprocessor circuit 90 can be used to determine and output touch coordinates. Clearly the light beams can be arranged to fill a three dimensional space if necessary and the circuitry be arranged to output three dimensional coordinates. Various other features can be added to suit particular requirements or applications.

Figure 2:
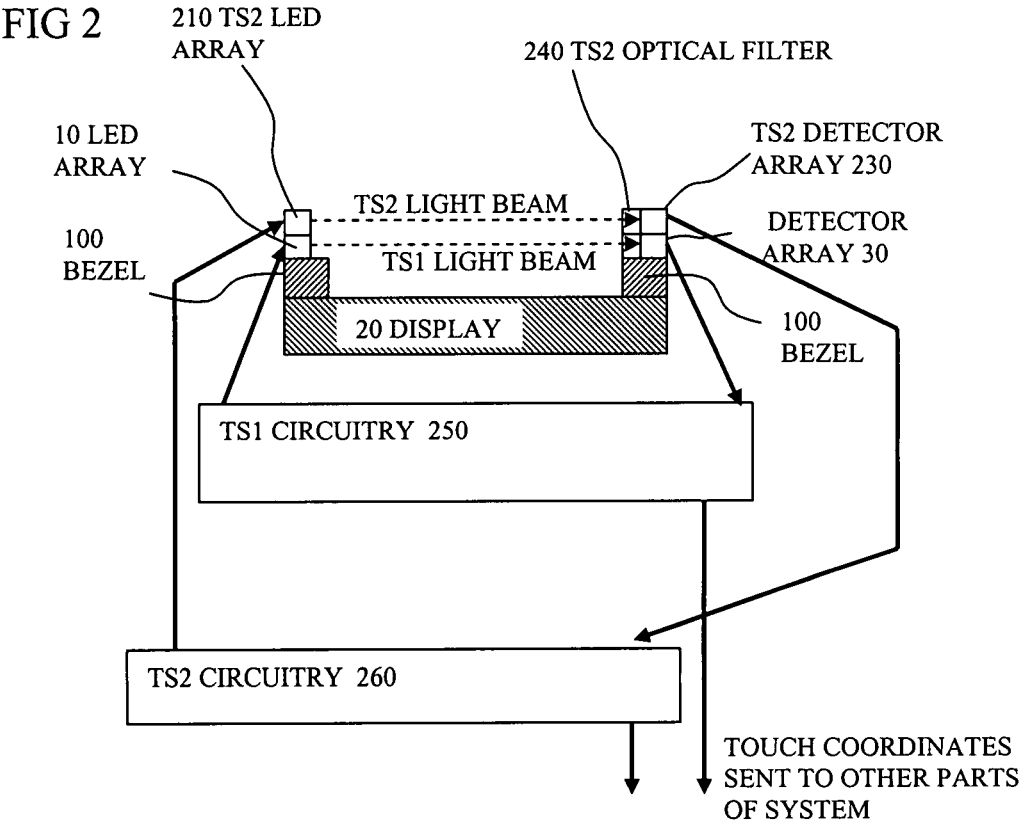
FIG. 2 shows an overall view of a dual touchscreen system according to embodiments of the present invention.

FIG. 2 Overall View of Dual Touchscreen System

FIG. 2 shows a similar touchscreen structure TS1 to that shown in FIG. 1, but with a second touchscreen TS2 overlaid. TS2 has its own LED array 210 placed to face a second detector array 230 and having its own optical filter 240. Hence some of the optical beams are for TS1 and some for TS2. As shown the beams for TS1 are closer to the display, but essentially both TS1 and TS2 have the same target region for touch detection. In principle the LEDS and detectors of TS1 and TS2 could be interleaved and so be in the same plane, though this may make construction more complex. Circuitry 250 is provided for TS1 for driving the LEDs and processing the detected signals, to output touch coordinates. Corresponding circuitry 260 is provided for driving the LEDs and processing the detected signals for TS2. In principle the circuitry could be shared by TS1 and TS2 but that would introduce some inter dependence and so reduce the effectiveness of the dual redundancy in protecting against failures. The touch coordinates could be fed to a selector or combiner to compare and decide what to output in the event of a difference, following established practice for dual redundancy. In some cases the circuitry can have a synchronized detector though other ways of achieving sufficient discrimination can be envisaged. Power supplies can be made independent also, for the two or more touchscreens.

Figure 3:
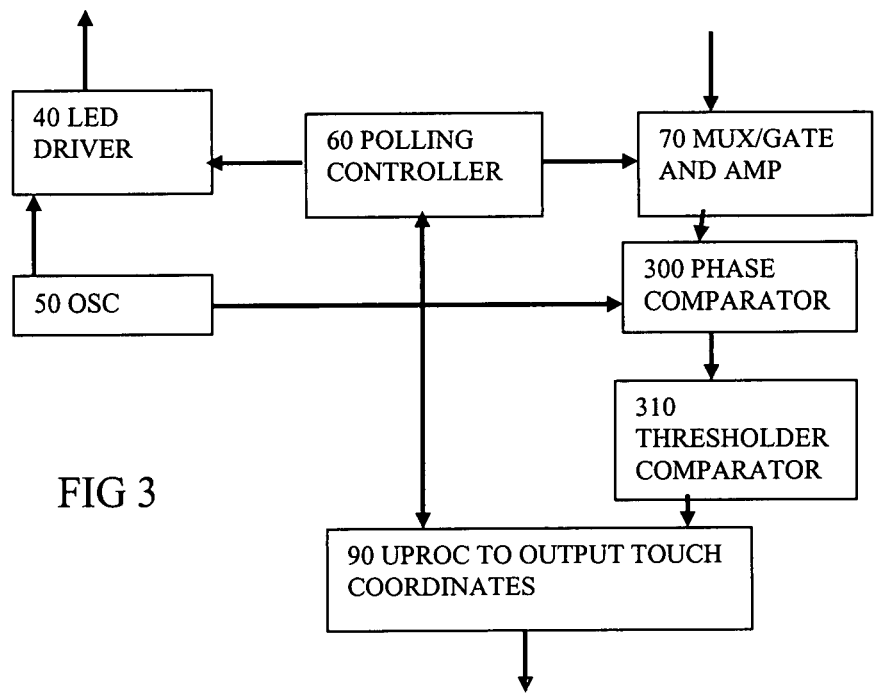
FIG. 3 shows circuitry having a Synchronised Detector.

FIG. 3 Circuitry Having Synchronised Detector

FIG. 3 shows an example of circuitry having a synchronized detector. This can be used with the touchscreen embodiments set out above, or with other embodiments. As described before for FIG. 1, there is a local oscillator 50 producing a carrier or tone for use in modulating the LEDs. The carrier is fed to a LED driver circuit 40 which is coupled to the LED array. The detector array is coupled to a circuit 70 arranged to multiplex or gate the signals from the detector array and amplify them before they pass to a synchronized detector in the form of a phase comparator 300 followed by a thresholder 310. The phase comparator is fed by the local oscillator 50 with the same carrier signal as used for driving the LEDs, and determines how close in phase are the two signals. There are various ways to implement this. The thresholder determines if the phase is sufficiently close to count as detecting the beam, otherwise a beam interruption is recorded.

A polling controller 60 is shown for controlling which beam or beams are active at a given time. As before, based on the output of the thresholder for all the beams, a microprocessor circuit 90 can be used to determine and output touch coordinates according to which beams have been interrupted.

Figure 4:
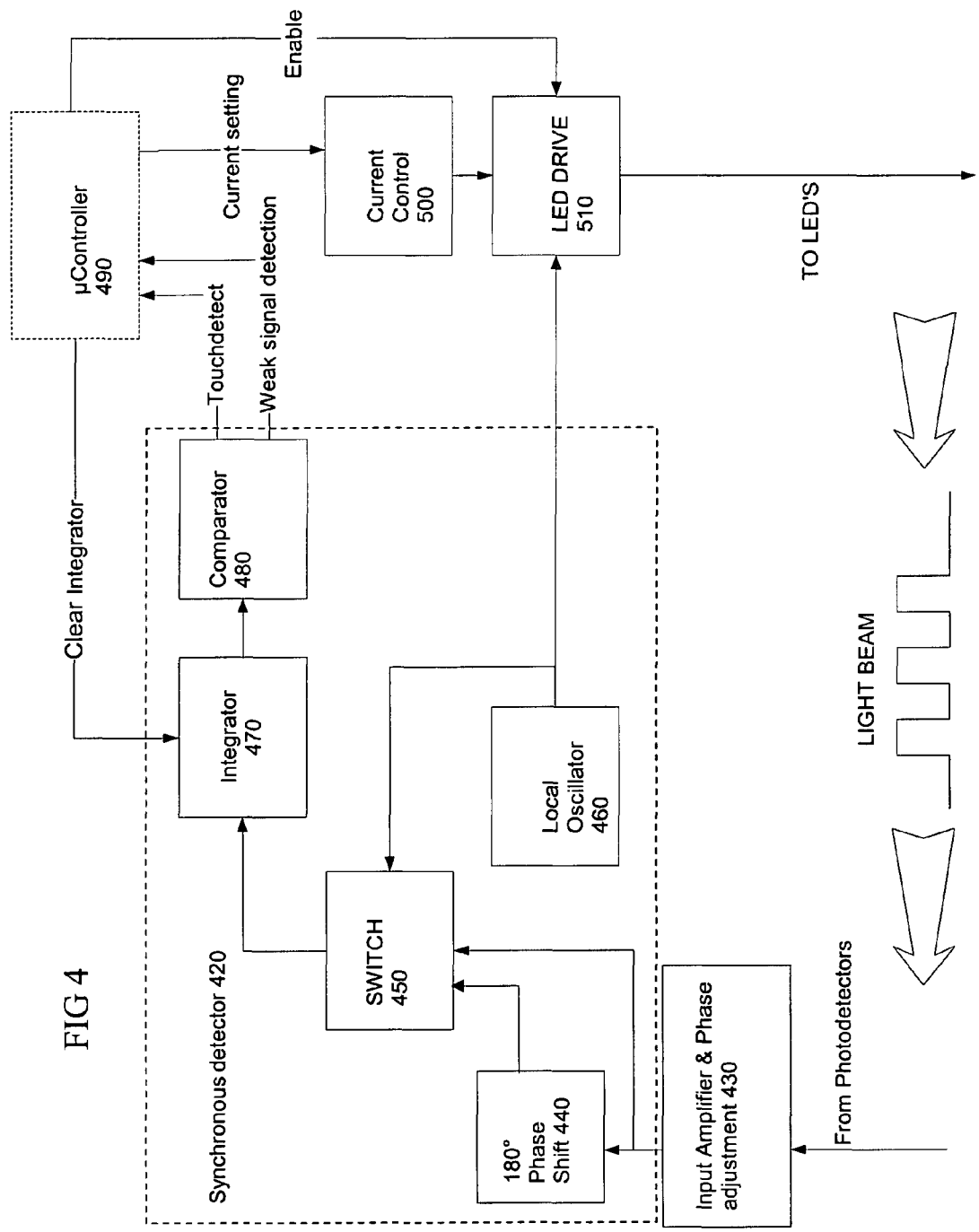
FIG. 4 shows an Integrator based Synchronised Detector.

FIG. 4 Integrator Based Synchronised Detector

FIG. 4 shows a synchronous detector 420 and various associated circuits. The signals from the detector array are processed first by an input amplifier and phase adjustment part. The amplifier is needed particularly if the detectors are photodiodes, as the photocurrents generated by photodiodes are very small (order of magnitude is a few nA). A phase adjustment is often needed to compensate for variations in characteristics of the detectors. This can be a one off adjustment fixed at the time of manufacture. The signals are then fed to the synchronous detector 420 which has a switching inverter formed in this case by a switch 450 which is fed by the detection signal and an inverted version of the same signal. The output is fed to an integrator 470. The switch feeds through either the signal or an inverted version, created by a 180° phase shifter 440. The switch is controlled by the carrier or tone used to drive the LEDs, using local oscillator 460. Hence for half a carrier period the original signal is passed through, and for the other half the inverted version is passed.

Thus if the signals received are in phase with the local oscillator, then the signal passed through to the integrator will not tend to cancel out, and the output of the integrator will decrease with time. The integrator output should converge to a stable state, no matter whether it is high or low. In contrast, noise tends to cancel out since it is inverted half the time.

A µController 490 is provided to output a signal to clear the integrator, and to control when to read an output of the integrator as a touch detect signal. The output of the integrator is compared to a threshold by comparator 480. Optionally more than one threshold can be used. If the signal is clearly above a high threshold, this can be output as a touch signal to the µController. If the signal is clearly below a lower threshold, this could be a no touch. If the signal is between the thresholds, measures such as increasing the LED current, could be taken to clearly determine a touch or no touch condition.

Also shown are a current control part 500 and an LED drive circuit 510. The controller 490 can be arranged to increase a drive current in the event of a weak signal being detected, to determine if the detection of the beam is dependent on this. This could be used just for set-up and tuning, or it could be used during the operation of the touchscreen to adapt to present conditions.

The detection circuitry can be implemented using any of many different technologies such as ASICs, discrete logic circuits, analogue signal processing circuitry, software controlled DSP circuitry, software controlled general purpose microprocessor circuitry and so on.

In principle the switch can be controlled by a signal based on an integer multiple or integer division of the local oscillator output, provided it is in phase, or phase locked to the modulation of the emitter. In principle there can be more than one local oscillator, for different ones of the emitter-detector pairs.

Applications:

As mentioned, the embodiments can find uses in any applications where high performance is needed in terms of ability to discriminate the touch detection amongst noise or other touchscreens, at lower emission powers, or where redundancy against failures is needed, or night vision compatibility, such as avionics displays, civil and military life critical applications. Some embodiments can find uses in any life critical applications that want to use touchscreen as primary means of user input for life critical data, where independent dual touchscreen is necessary. Any avionics integrator interested in implementing touchscreen into the cockpit, competitor avionics display manufacturers that want to integrate touchscreen for life critical applications, other system integrators in military or civil markets where life critical applications based on displays are in use.

Other variations, features and advantages can be envisaged by those skilled in the art, within the scope of the claims.

The invention claimed is:

1. A touchscreen system for locating an opaque object in a target region, by detecting interruption of light beams, the system comprising two or more independent touchscreens, each of the touchscreens having one or more optical emitters to create the light beams, one or more optical detectors to provide detection signals, and circuitry configured to determine location coordinates of the opaque object from the detection signals,
   wherein each touchscreen has drive circuitry configured to modulate its respective optical emitter or emitters, and detection circuitry configured to detect the same respective modulation in the detection signals, and discriminate from any modulated emission from all other touchscreens.

2. The system of claim 1, the detection circuitry of a given one of the touchscreens being synchronized to the drive circuitry of the same touchscreen.

3. The system of claim 2, the detection circuitry having an integrator coupled to an output of a switching inverter, the switching inverter being arranged to switch between outputting an inverted or not inverted version of a given detection signal, the switching being arranged to be in phase with the modulation of the corresponding emitters.

4. The system of claim 3, the detection circuitry having a comparator configured to compare an output of the integrator with one or more thresholds, so as to determine an interruption of the corresponding beam and therefore indicate a touch.

5. The system of claim 1, comprising circuitry arranged to control an emission power of the emitters according to an output of the detection circuitry.

6. The system of claim 1, the touchscreens being arranged to create beams covering a planar target region.

7. The system of claim 6, each touchscreen having its respective emitters and detectors mounted on a frame around the planar target region, the frames being adjacent to each other so that their target areas are parallel and adjacent.

8. The system of claim 1, the touchscreens being arranged to use emission wavelengths which are compatible with night vision apparatus.

9. A display system having the touchscreen system of claim 1 in front of a display screen.

10. Detection circuitry for use as part of a touchscreen system comprising two or more independent touchscreens, each touchscreen having one or more optical emitters arranged to create light beams, one or more optical detectors to provide detection signals, and drive circuitry to modulate the emitters, the detection circuitry being arranged to receive the detection signals, and discriminate the same modulation in the detection signals, by integrating an output of a switching inverter, the switching inverter being configured to switch between outputting an inverted or not inverted version of each detection signal, the switching being in phase with the modulation of the corresponding emitters,
    wherein each touchscreen has drive circuitry configured to modulate its respective optical emitter or emitters, and detection circuitry configured to detect the same respective modulation in the detection signals, and discriminate from any modulated emission from all other touchscreens.

11. A touchscreen system for locating an opaque object in a target region, by detecting interruption of light beams, comprising two or more independent touchscreens, each touchscreen having one or more optical emitters to create the beams, and one or more optical detectors to provide detection signals, drive circuitry to modulate the emitters, and detection circuitry to detect the same modulation in the detection signals, the detection circuitry having an integrator coupled to integrate the output of a switching inverter, the inverter being configured to switch between outputting an inverted or not inverted version of each detection signal, such that the switching is in phase with the modulation of the corresponding emitters,
    wherein each touchscreen has drive circuitry configured to modulate its respective optical emitter or emitters, and detection circuitry configured to detect the same respective modulation in the detection signals, and discriminate from any modulated emission from all other touchscreens.

* * * * *